Sept. 16, 1958  A. SHERMAN  2,852,738
PROTECTION TUBE LEAK-CHECKER FOR THERMOCOUPLES
Filed June 15, 1955
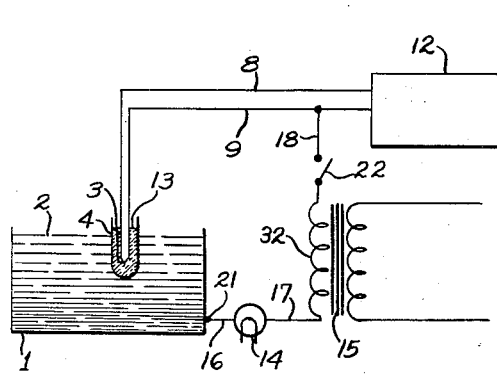
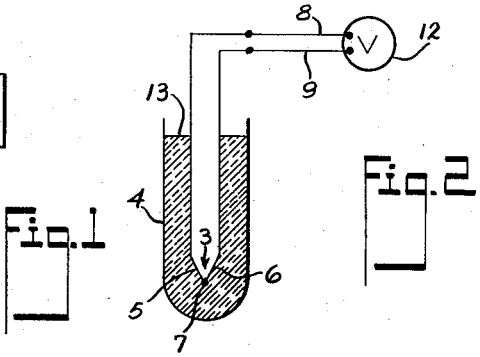
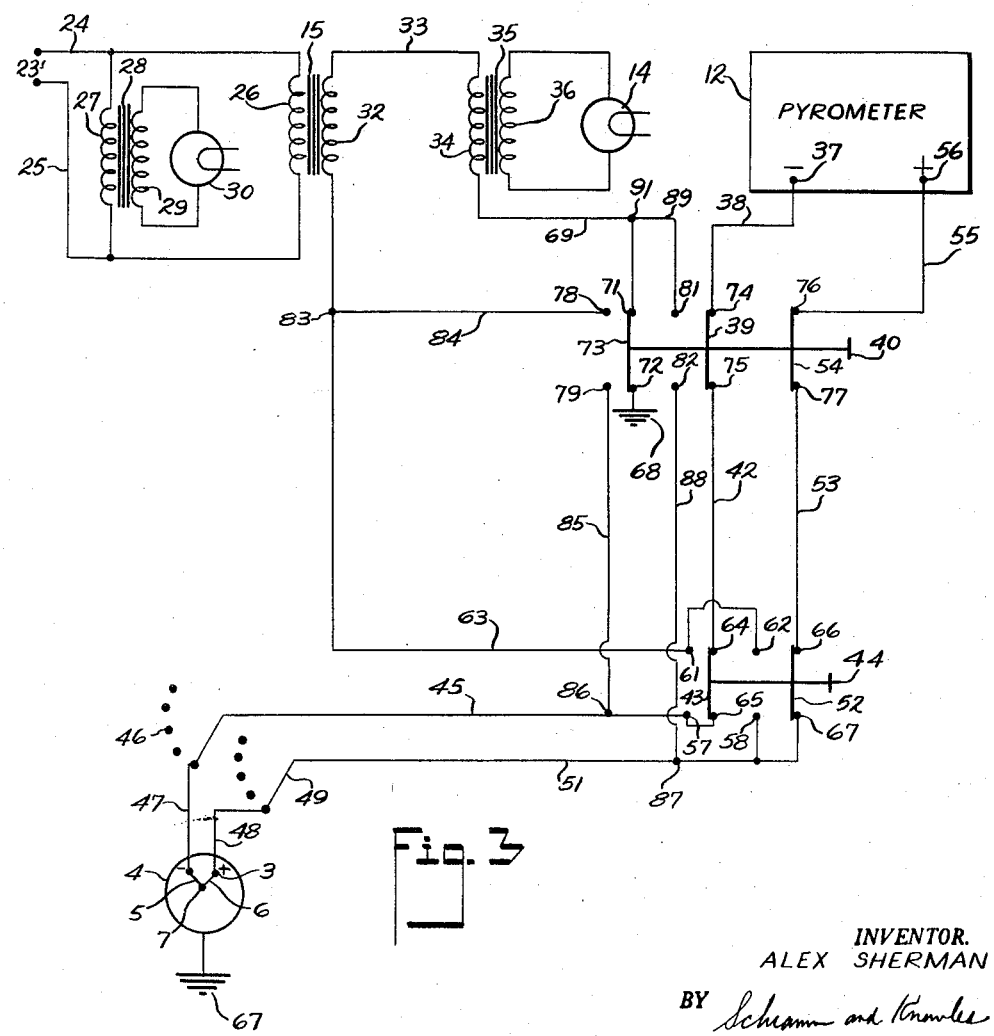
INVENTOR.
ALEX SHERMAN
BY Schramm and Knowles
ATTORNEYS United States Patent Office 2,852,738
Patented Sept. 16, 1958

1

2,852,738

PROTECTION TUBE LEAK-CHECKER FOR THERMOCOUPLES

Alex Sherman, Warren, Ohio

Application June 15, 1955, Serial No. 515,715

4 Claims. (Cl. 324—54)

This invention relates to an arrangement for checking for a leak in the protective tube or well of a thermocouple or other electric type of temperature responsive unit. The invention may be carried out in conjunction with a thermo-couple maintenance circuit of the type illustrated in Fig. 4 of the patent of Ralph Sherman, Number 2,701,965 of February 15, 1955.

My arrangement guards against inaccuracies or failure resulting from the penetration of a liquid or fumes from a bath, such as salt or molten zinc or aluminum, or the like, into the protective well of a thermo-couple which may result either in short circuiting a portion of the thermo-couple wires so that temperature is not measured at the original thermo-couple junction but somewhere else within or outside the bath where a different temperature may exist, or in the contamination of the thermo-couple so that its temperature responsive characteristics are altered. It is, therefore, an object of this invention to indicate conditions under which faulty temperature readings may be obtained from a thermo-couple, and erroneous heat treating temperatures may result.

An additional object of this invention is to give warning that the protective tube or well has reached the end of its useful life and should be replaced.

An additional object of this invention is to furnish warning that a solution, the temperature of which is being measured, has penetrated the protective well surrounding the thermo-couple to permit removal of the thermo-couple from the bath before it has been irreparably damaged by attack by the solution and before the electrically insulating material disposed between the thermo-couple and the protective tube has been dissipated.

A further object of this invention is to provide a warning system which will alert the operator to penetration of the protective tube or well to permit removal of the thermo-couple from a tank of liquid before the liquid has been contaminated by the insulating substance or particles from the well or thermo-couple.

A further object of the invention is to enable the operator to be assured that temperature readings are correct and unaffected by penetration of the well, or by formation of electrical contact with the thermo-couple by the electrolyte solution, or by corrosion, oxidation, or the like of contacts in the temperature indicating circuit, or by deterioration of the thermo-junction.

A more specific object of the invention is to enable the operator to test selectively both the condition of the thermo-couple protective well or tube and the condition of contacts in the temperature indicating circuit including the thermo-couple.

Further objects and advantages will be apparent to one skilled in the art and from the following detailed description and accompanying drawings which are a part of this specification.

In the drawings:

Fig. 1 is a schematic drawing of a thermo-couple and liquid bath with parts shown on an enlarged scale for illustrative purposes and a circuit diagram of the present invention;

Fig. 2 is a schematic drawing on an enlarged scale of a thermo-couple and attached indicating apparatus; and Fig. 3 is a schematic circuit diagram of a thermo-couple and protective tube, a voltage responsive test element in the form of a pyrometer, and the diagram of a combination test circuit to check the protective tube condition and the condition of contacts in the temperature responsive electric circuit.

Referring to Fig. 1, there is shown a tank 1 containing a conductive fluid bath 2 which may, for example, be a salt bath furnace, a galvanizing tank containing molten zinc, an electroplating tank containing a plating solution, a tank for carrying out a chemical process or any other equipment in which a molten or liquid substance is contained or there is a pulverulent substance or conductive gaseous substance which cannot safely be permitted to come into direct contact with the thermo-junction and the leads of a thermo-couple temperature indicator or the resistance unit and the leads of a resistance type temperature indicator or the like, employing electric circuits.

A thermo-couple 3 disposed in a protective well 4 is partially immersed in the solution 2 to measure the temperatures of the solution. The thermo-couple 3 is of a type having electrodes or wires 5 and 6 of dissimilar metals, such as platinum and platinum-rhodium alloy, which are in contact to form a junction 7. A thermo-junction or temperature responsive circuit is provided to obtain a temperature indication by measuring the voltage set up at the thermo-junction 7 through thermal action. The potential difference thus set up is conducted through conductors 8 and 9 to a temperature indicating apparatus 12 which, as shown schematically in Fig. 3 may be a pyrometer, or as shown schematically in Fig. 2, may be a millivoltmeter calibrated in units which indicate the temperature of the bath. The tube or well may contain a neutral electrically insulating powdered substance, porcelain tip, insulating tip, or packing 13 for more quickly transferring temperature effects from the solution 2 to the thermo-couple 3.

For providing an alarm in the event of penetration of the well 4 a current flow indicator 14 such as a bell, light, or other warning or indicating device, and a current source, such as a transformer 15 as shown in Fig. 1, or a battery or other current source are connected in series through a circuit which includes conductors 16, 17, and 18.

The conductor 16 is connected to the tank 1 as at 21. If the tank is formed of a non-conductive material, the connection 21 will be made through an electrode, or the like, provided in contact with the solution 2 to complete a circuit. The conductor 18 is connected to one of the wires or leads 8 and 9 forming a thermo-couple measuring circuit. A switch 22 may be included in the circuit. A switch such as the switch 22 is not needed for isolating the test current source from the pyrometer circuit if a different character of test current such as high frequency is employed in conjunction with suitable filtering means. During normal functioning, the protective tube 4 provides a protection for the thermo-couple from the effects of direct contact with the substance in the tank. If the tube should become, through chemical attack or other reasons, penetrated by the substance 2 in the tank 1 a short circuit may result, causing an undesired or a spurious thermo-junction to take place at a point other than at the original thermo-junction in the tank, where a different temperature usually prevails. In addition, chemical action is apt to take place, attacking the metal of the thermo-couple, which will affect the chemical, and therefore, the thermal characteristics of the thermo-junction, and thus, cause inaccurate readings to be obtained and, perhaps, destruction of the thermo-couple.

To guard against such errors and against unobserved failure of the thermo-junction circuit, the previously described warning alarm circuit is provided. As long as the protective tube 4 is in good order, the circuit through the wires or conductors 16, 17 and 18 and the current flow indicator 14 and the current source 15 is incomplete, because of the insulating character of the packing 13 or air within the tube. In case of penetration of the tube by the bath 2 a circuit will be formed through the bath 2, the thermo-couple 3, the conductor 9, the conductors 18, the switch 22 (which is closed), secondary winding 32 of the transformer 15, conductor 17, indicator 14, and conductor 16 to the connection 21 with the tank 1. The current flow indicator 14 will indicate that the circuit has been completed and warn the operator that a flaw has been detected in the tube 4.

The bath or solution 2 must, of course, be ionized or conductive to some degree. The features of the invention and principles involved are, however, operable with any conductive fluid. It is only necessary to provide a current flow indicator and a current source of appropriate size and capacity for the resistant characteristics of the particular bath, of which the temperature is being taken.

Referring to Fig. 3, a modified test circuit is disclosed which employs in combination with the test circuit for determining the condition of the protective tube, a test circuit for determining the condition of the temperature-responsive or indicating circuit and particularly for the condition of contact 7 in the thermo-couple 3 and its circuit to the pyrometer 12. While the circuit disclosed in Fig. 3 is one which is designed for 110 volt test circuit or the like, test circuits employing other voltages, such as a 6 volt test circuit employing the principles disclosed by Fig. 3 may readily be constructed with only moderate modification by one skilled in the art.

If a 110 volt power source is employed, the transformer 15, as disclosed in Fig. 3, may serve simply as an insulating transformer to protect against short circuits or grounds in the power supply source.

A source of voltage, 23, is connected through conductors, 24 and 25, to primary coil, 26, of the test or insulating transformer, 15, and to primary coil, 27, of indicating transformer, 28, the primary coil, 27, being connected in parallel with the primary coil, 26. The transformer, 28, which may be termed a circuit indicating transformer, has a secondary coil, 29, which is connected to an indicating device, such as an incandescent light, 30, which serves to indicate to the operator that the test circuit is operating.

The secondary winding, 32 of the test transformer, 15, is connected through conductor, 33, to primary winding 34 of condition transformer, 35. The condition transformer has a secondary coil, 36, which is wired to the current flow indicator, or condition indicating device, 14, which here takes the form of an incandescent lamp.

If the current flow indicator, 14, employed is of appropriate voltage capacity for the test circuit, as for example, when a six volt or similar test circuit is employed, the condition transformer, 35, may, of course, be eliminated.

Negative contact, 37, of the voltage testing device, 12, which here takes the form of a pyrometer, is connected through conductor 38 to a normally closed contact arm 39 of push button 40 through contact 74. The normally closed contact arm 39 of push button 40 is wired in series through contact 75 and through conductor 42 to contact 64 and normally closed contact arm 43 of push button 44. The contact arm 43 is connected through contact 65 and through conductor 45 to selector switch 46 and thence through conductor 47 to the negative side of the thermo-couple 3. The positive side of the thermo-couple is connected through conductor 48 of selector switch 49. The selector switches 46 and 49 are employed to permit one testing apparatus to be connected to any one of a plurality of protective tube enclosed thermocouples in various tanks, or perhaps a plurality of themo-couples employed in a single tank which an operator may wish to test. The selector switches 46 and 49 here shown are provided with five terminals with connections to other thermo-couples, not shown. The number, of course, is not critical since any number of contacts might be furnished to permit the test circuit to be wired to any number of thermo-couples.

The selector switch 49 is connected through conductor 51 and through contact 67 to normally closed contact arm 52 of the push button 44. The contact arm 52 is connected in series through contact 66, conductor 53 and contact 77 to normally closed contact arm 54 of push button 40 the normally closed contact arm 54 being connected through contact 76 and through conductor 55 to positive contact 56 of the pyrometer 12.

The negative side of the thermo-couple 3 is also connected through the conductor 45 to contact 57 of the push button 44 and the positive side of the thermo-couple 3 is connected through the conductor 51, to contact 58, of the push button 44. The contacts 57 and 58 may be, upon depression of the push button 44, connected to contacts 61 and 62, respectively, to form circuits which are connected through conductor 63 to the secondary coil, 32, of the insulating transformer 15. Compression of push button 44, contact arm 43 interrupts the circuit formed between contacts 64 and 65; while contact arm 52, interrupts the circuit formed between contacts 66 and 67. Thus, by depression of the push button 44, the pyrometer circuit to the thermo-couple is interrupted, and by further depression of the push button 44, a circuit is formed from the secondary coil 32 of the insulating transformer directly to both sides of the thermo-couple 3. If the thermo-couple well 4 is whole the circuit will not be completed. However if there is a flaw in the well the circuit, such as that previously described with respect to Fig. 1, will be completed through the conductive solution to a tank which may be grounded, the circuit of the primary coil 34 of the indicating transformer 35 being grounded as indicated at 68. The primary coil 34 is connected to the ground 68 through conductor 69 and contacts 71 and 72 of the push button 40 which are connected by contact arm 73, when the push button 40 is not depressed.

The push button 44, of course, may be employed in the circuit shown in Fig. 1 to protect the temperature indicating element 12. Since a push button will perform the function of switch 22, the latter may be eliminated.

While both push button 40 and push button 44 are shown with connections arranged to interrupt both lines in the temperature responsive or thermo-couple pyrometer circuit, it is within the scope of the invention to provide for interruption of only one side of such circuit. Preferably however, both sides of the circuit are broken as shown to better protect the temperature responsive element by guarding against injury to the pyrometer through short circuits or the like.

To test the condition of the contacts and of the thermo-couple in the temperature responsive circuit the push button 40 is depressed to break such circuit by moving the contact arm 39 out of contact with the contacts 74 and 75 and the contact arm 54 out of contact with the contacts 76 and 77. The ground circuit for the condition indicating apparatus is also broken by moving the contact arm 73 out of contact with the contacts 71 and 72. The push button 40 is further depressed until the contact arm 73 completes the circuit between contacts 78 and 79 and the contact arm 39 completes the circuit between contacts 81 and 82. Such movement of the push button 40 forms the contact condition test circuit which flows from the secondary coil 32 of the power transformer 15 to connection 83 and thence along conductor 84 to the contact 78, through the contact arm 73 to the contact 79, thence along conductor 85 to a connection formed at 86. The connection 86 is formed between conductor 85 and conductor 45. Such circuit thus continues through the conductor 45, the selective switch 46, the conductor 47, the elements 5 and 6 of the thermocouple 3, and the junction 7 between the elements, the conductor 48, the selector switch 49 and conductor 51 to a connection formed at 87. The connection formed at 87 is connected by conductor 88 to the contact 82 which is connected to the contact 81 through the contact arm 39. The contact 81 is connected through conductor 89 to connection 91 which connects the conductor 89 to the conductor 69. The circuit is then completed through conductor 69, primary coil 34 of the indicating transformer 35, which is in turn connected to the secondary coil 32 of the insulating transformer by the conductor 33. If the contacts are in good condition a relatively heavy flow of current will flow through this condition circuit and the secondary coil 36 of the test transformer 35 will receive a substantial amount of electric potential which will, in turn, cause the current responsive element 14 to indicate such a substantial potential. The incandescent lamp disclosed in Fig. 3 will therefore, glow brightly when the condition of the various contacts are in good order. However, if the condition of one or more of the contacts is poor, or the thermo-couple has deteriorated in a certain manner or when there is a corroded contact, the lamp 14 will either glow dimly or will not glow at all.

Thus by simply pressing one push button an operator, who should have first observed that the indicating lamp 30 is glowing, may determine the condition of the protective well, and by pressing another push button he may determine the condition of various of the contacts in the temperature responsive circuit. By making such tests the operator is assured of the accuracy of the temperature readings furnished by the pyrometer, and through such apparatus, connected by a pair of multiple contact switches, the operator may, from a single control panel, determine the condition of temperature measuring circuits for a plurality of liquid tanks such as liquid electroplating tanks.

It may thus be seen that a device has been provided which will warn an operator of flaws in a protective tube or well about a thermo-couple and a device has also been provided which may either be employed to warn the operator of flaws in the temperature indicating circuit or of flaws in the protective tube.

In accordance with the patent statutes the principles of the present invention may be utilized in various ways, numerous modifications and alterations being contemplated, substitution of parts and changes in construction being resorted to as desired, it being understood that the embodiment shown in the drawings and described above is given merely for purposes of explanation and illustration without intending to limit the scope of the claims to the specific details disclosed.

What I claim and desire to secure by Letters Patent of the United States is:

1. In combination, a device for testing both the condition of contacts in a temperature indicating circuit including a potential generating thermo-couple having a protective well for insertion in a conductive fluid bath and the condition of the protective well, said device comprising a temperature indicating circuit comprising a thermo-couple disposed within a protective well, a temperature indicating device, and conductors connecting the thermo-couple to the temperature indicating device, said indicating device being responsive to potential generated by said thermo-couple, a source of test current, a source current flow indicator to indicate flow of current from the test current source, a test current flow indicator, a well condition test circuit, means to interrupt said temperature indicating circuit and to connect said well condition test circuit, said well condition test circuit comprising said source of test current, said test current flow indicator, said thermo-couple, and conductors serially connecting the thermo-couple to the test current source and the test current flow indicator, through said well condition test circuit connection means, said well condition test circuit being completed only when said test current flow indicator and said thermo-couple are connected through a conductive bath in which the well is immersed, said bath having penetrated the well through an imperfection, a circuit to test contact condition in said temperature indicating circuit, and means to interrupt said temperature indicating circuit and to close said contact condition test circuit, the latter including serial connection of said test current flow indicator, said thermo-couple, said source of test current, and said test current flow indicator through said contact test circuit closing means.

2. In combination, a device for testing both the condition of contacts in a temperature indicating circuit including a potential generating thermo-couple having a protective well for insertion in a conductive fluid bath and the condition of the protective well, said device comprising a temperature indicating circuit comprising a thermo-couple disposed within a protective well, a temperature indicating device, and conductors connecting the thermo-couple to the temperature indicating device, said indicating device being responsive to potential generated by said thermo-couple, a source of test current, a test current flow indicator, a well condition test circuit, a first push button to interrupt said temperature indicating circuit and to connect said well condition test circuit, said well condition test circuit comprising said source of test curent, said test current flow indicator, said thermo-couple, and conductors serially connecting the thermo-couple to the test current source and the test current flow indicator, through said first push button, said well condition test circuit being completed only when said test current flow indicator and said thermo-couple are connected through a conductive bath in which the well is immersed, said bath having penetrated the well through an imperfection, a circuit to test contact condition in said temperature indicating circuit, and a second push button to interrupt said temperature indicating circuit and to close said contact condition test circuit, the latter including serial connection of said test current flow indicator, said thermo-couple, said source of test current, and said test current flow indicator through said second push button.

3. In combination, a device for testing both the condition of contacts in a temperature indicating circuit incuding a potential generating thermo-couple having a protective well for insertion in a conductive fluid bath and the condition of the protective well, said device comprising a temperature indicating circuit comprising a thermo-couple disposed within a protective well, a temperature indicating device, and conductors connecting the thermo-couple to the temperature indicating device, said indicating device being responsive to potential generated by said thermo-couple, a source of test current, an insulation transformer to provide test current having potential suited to tests to be conducted and to guard against affecting such tests by short circuiting of the test current source, a test current flow indicator, a well condition test circuit, means to interrupt said temperature indicating circuit and to connect said well condition test circuit, said well condition test circuit comprising said source of test current, said test current flow indicator, said thermo-couple, and conductors serially connecting the thermo-couple to the test current source and the test current flow indicator, through said well condition test circuit connection means, said well condition test circuit being completed only when said test current flow indicator and said thermo-couple are connected through a conductive bath in which the well is immersed, said bath having penetrated the well through an imperfection, a circuit to test contact condition in said temperature indicating circuit, and means to interrupt said temperaure indicaing circuit and to close said contact condition test circuit, the latter including serial connection of said test current flow indicator, said thermo-couple, said source of test current, and said test current flow indicator through said contact test circuit closing means.

4. In combination, a device for testing both the condition of contacts in a temperautre indicating circuit including a potential generating thermo-couple having a protective well for insertion in a conductive fluid bath and the condition of the protective well, said device comprising a temperature indicating circuit comprising a thermo-couple disposed within a protective well, a temperature indicating device, and conductors connecting the thermo-couple to the temperature indicating device, said indicating device being responsive to potential generated by said thermo-couple, a source of test current, an insulation transformer to provide test current having potential suited to tests to be conducted and to guard against affecting such tests by short circuiting of the test current source, a test current flow indicator, a well condition test circuit, a test current transformer to convert the potential of test current to potential suitable for the capacity of the test current indicator, means to interrupt said temperature indicating circuit and to connect said well condition test circuit, said well condition test circuit comprising said source of test current, said test current flow indicator, said thermo-couple, and conductors serially connecting the thermo-couple to the test current source and the test current flow indicator, through said well condition test circuit connection means, said well condition test circuit being completed only when said test current flow indicator and said thermo-couple are connected through a conducive bath in which the well is immersed, said bath having penetrated the well through an imperfection, a circuit to test contact condition in said temperature indicating circuit, and means to interrupt said temperature indicating circuit and to close said contact condition test circuit, the latter including serial connection of said test current flow indicator, said thermo-couple, said source of test current, and said test current flow indicator through said contact test circuit closing means.

References Cited in the file of this patent

UNITED STATES PATENTS

| 2,684,475 | Lode | July 20, 1954 |
| 2,701,965 | Sherman | Feb. 15, 1955 |

FOREIGN PATENTS

| 547,840 | Great Britain | Sept. 14, 1942 |